July 5, 1955  C. E. KEENE  2,712,645
ELECTRO-MECHANICAL TRANSDUCER
Filed Feb. 25, 1953
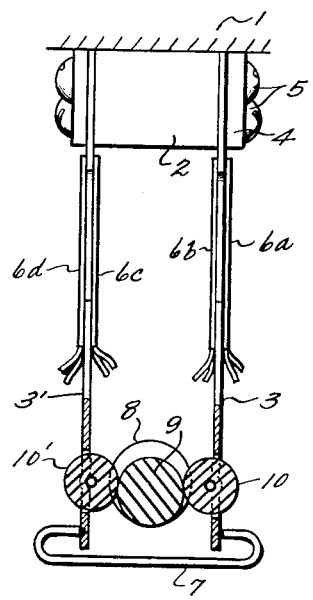
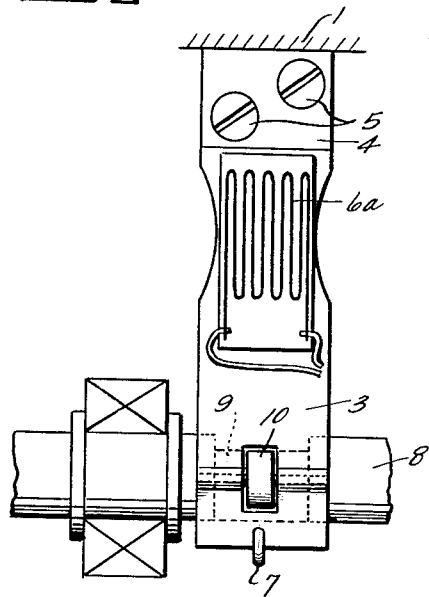
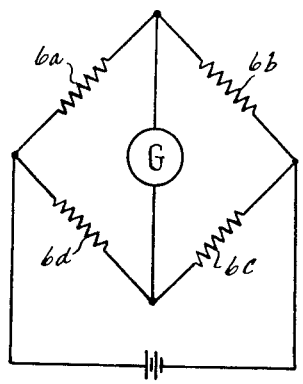
INVENTOR.
CARL E. KEENE
BY Jerome P. Bloom
Wade Koontz
ATTORNEYS

United States Patent Office 2,712,645
Patented July 5, 1955

2,712,645

ELECTRO-MECHANICAL TRANSDUCER

Carl E. Keene, Lancaster, Calif.

Application February 25, 1953, Serial No. 338,929

4 Claims. (Cl. 340—345)

(Granted under Title 35, U. S. Code (1952), sec. 266)

The invention described herein may be manufactured and used by or for the Government for governmental purposes without payment to me of any royalty thereon.

This invention relates to a new and novel electro-mechanical transducer which constitutes a position pick-off and signalling device adaptable to pick-off and transmit a signal corresponding to the movements of condition responsive elements in aircraft such as may have their movements in positioning transmitted through a rotating shaft. This invention is particularly applicable to control or indicating elements of an aircraft where it is necessary or desirable to transmit information of their movements for recording or control purposes. An example of an application of the invention is in flight test instrumentation which requires a means of recording control surface positions through the medium of direct current galvanometer recordings on light sensitive paper employed by the different makes of oscillographs currently used. Sliding contacts of potentiometers previously used in recording presented an imperfect contact and interference appeared on the records unless a low pass filter with a 10 cycle cut-off was used ahead of the galvanometer. This added undesirable weight and presented an increased number of components necessary to obtain the required results. Another alternative was to use an A. C. or D. C. amplifier with an associated filter to amplify the data signal and facilitate the use of a less sensitive recording galvanometer. This system also contributed to large and heavy equipment for which there is not ample space available in the small type aircraft requiring testing. In both the noted systems temperature compensation was necessary since the potentiometer is not a balanced unit and resistance varies with the temperature. Heretofore there was no satisfactory solution to the problems thus presented.

The device which is the subject of this invention presents an improved means for facilitating recording or transmission of a control signal, a means which is not affected by temperature and is normally a fully balanced unit that presents a highly simplified structure, resulting in economy of expense as well as space and adapting it for highly efficient use under any and all conditions that may be presented to receive a condition responsive signal from any movable element when the movement may be transmitted through a rotating shaft.

An object of this invention is to provide a new and novel electro-mechanical transducer.

Another object of this invention is to provide a novel transducer particularly applicable to transmission of signals from the control or indicating elements on an aircraft to provide appropriate signals for control or informational purposes wherein the structure has been highly simplified and greatly reduced in weight and bulk.

A further object of the invention is to provide a novel transducer employing strain gages as the legs of a Wheatstone bridge wherein on unbalance thereof sufficient output is provided to directly operate a standard galvanometer, eliminating the need for amplification.

Further objects and advantages of the invention will become readily apparent from the following specification taken in conjunction with the accompanying drawings wherein Figure 1 is a view of the transducer in combination with its input signal means. Figure 2 is a side view of the structure shown in Figure 1 and Figure 3 is a schematic of the application of the transducer in the form of a Wheatstone bridge for providing a recording signal.

The transducer which is the subject of the invention as noted in Figure 1 is composed of a frame 1 having a mounting block 2 secured thereto. Flat elongated arms 3 and 3' are connected to the mounting block 2 and secured thereto by means of plates 4 and screws 5 as shown in the drawings. Strain gages 6a, 6b, 6c and 6d are respectively cemented to each opposed inner and outer side of the arms 3 and 3' as shown in the drawings. These strain gages may be of the Baldwin SR-4 type. A spring member 7 connects the arms 3 and 3' at their extremities and holds them under continuous spring tension relative to the rotating signal transmitting shaft 8 which has an eccentric 9 integral therewith. The signal transmitting shaft 8 may be connected to any movable element whose movements must be recorded or employed for control purposes and whose movements are capable of transmission through a rotating shaft. The preferred application is to the control elements on an aircraft, for example, to an angle of yaw or angle of attack sensing vane. Rollers 10 and 10' connected to the respective arms 3 and 3' by pivot pins as shown and arranged in opposed apertures therein are held in contacting relation with the eccentric 9 under pressure of the biasing retainer spring 7 at all times. In a null position of the eccentric as shown, the arms are in parallel relation. As noted, shaft 8 may be connected to any movable element which is condition responsive and whose movements may be transmitted through a rotating shaft to provide a signal of its condition. The strain gages 6a, 6b, 6c and 6d as shown in Figure 3 are connected in such a way to form a complete four legged bridge and give maximum unbalance with respect to strain; that is 6a and 6c form opposite sides and 6b and 6d form the other two sides so that 6a and 6c expand with one direction movement and 6b and 6d compress with the same movement to give maximum bridge unbalance. There is no electrical connection between the strain gages and the respective arms so that a floating voltage source may be used to excite the bridge. Thus there is provided a complete four active element bridge which has no sliding contacts and is balanced to zero output in neutral position. Two or more bridges may be operated in series or parallel to provide the required output. Also two or more bridges may be operated from the same shaft with like or different eccentric surfaces arranged thereon. In the particular form shown the output is linear approximately 50° to either side of the neutral position. It is again noted that temperature compensation is unnecessary since all legs of the bridge are exposed to the same degree.

As can be readily seen the motion of any element which may be transmitted through a rotating shaft will act on the shaft 8 and its integral eccentric 9 to turn it from a neutral position to unbalance the normal condition of the strain gages, unbalance the bridge circuit, providing a signal for recording or control purposes without presenting any problem of sliding contacts. The repetition of the signal so provided has been found to be extremely good and comparable to an autosyn system as revealed by laboratory tests. Operating frequency is limited only by the natural frequency of the strain gage arms, for example an arm length ¾ of an inch has a natural frequency of 340 C. P. S. This frequency can be raised or lowered by mechanical design. Where a recording oscillograph is employed with a type galvanometer with a low sensitivity and a more sensitive element is unavailable, the bridge provided by the transducer may be excited with alternating current and amplified to provide the required data without any difficulty. Extremely small strain movements may be obtained by the use of amplification with the invention since the repetition of the transducer unit is extremely good. While only a preferred embodiment of the invention has been shown and described, many modifications and variations thereof as well as variations of applications thereof will be readily apparent to those skilled in the art and the invention is intended to be limited in scope only as to limitations which are set forth in the claims.

What I claim is:

1. A signal pick-off and transmitting means comprising a housing, a mounting block secured to said housing, means securing elongated arms to said mounting block in spaced parallel relation in a null position, signal transmitting means respectively mounted on opposed faces of the parallel arms, a rotatable input signal transmitting shaft extending transverse to said spaced parallel arms intermediate thereof and having an eccentric disposed intermediate opposing faces of the arms, abutment means engaging the opposing faces of said arms and in zero position abutting diametrically opposite points on said eccentric and resilient means engaging the opposed free ends of said arms biasing said arms and said abutments into engagement with said eccentric whereby a balanced null condition obtains, said signal transmitting means being responsive to rotation of said eccentric within a predetermined range and displacement of said arms from a zero position condition to transmit an appropriate signal in proportion to such displacement.

2. In combination a rotatable shaft having an eccentric thereon, which shaft is adapted to transmit the movements of a movable element, an electro-mechanical transducer comprising mounting means, elongated arms secured to said mounting means and extending outwardly therefrom in normally spaced parallel relation, strain gages arranged on the opposed faces of each arm and connected to form a bridge, said eccentric being disposed intermediate opposing faces of said arms, said arms having means diametrically abutting said eccentric in zero position and biasing means retaining said arms and abutting means in contact with the eccentric whereby within a predetermined range will cause deviation of said arms and strain gages from a normal condition to unbalance the strain gage bridge circuit and provide an output in proportion to the input signal transmitted through said eccentric from the rotatable shaft.

3. In combination with a signal transmitting rotatable shaft having an eccentric thereon, a signal pick-off and transmitting means comprising a frame, two arms mounted on said frame and extending outwardly therefrom in spaced parallel relation, strain gages respectively mounted on opposed faces of each arm and forming the legs of a bridge circuit, the eccentric on the signal transmitting shaft being disposed intermediate the opposed faces of said arms and spaced equally therefrom in a null position, roller means connected to each arm and contacting said eccentric maintaining the arms in a predetermined spaced relation, and means biasing said arms toward each other, whereby on rotation of said eccentric upon signal transmission through the shaft within a predetermined range, the arms and their respective strain gages will be correspondingly biased out of the null position to unbalance the strain gage bridge circuit and transmit the input signal.

4. An electro-mechanical transducer for transmitting a signal input from a rotatable shaft having an eccentric thereon comprising a housing frame, spring biased strain gage mounting means extending from said frame in spaced parallel relation in a null position, strain gages respectively mounted on said mounting means in a balanced relation to form a bridge circuit, means adjacent the ends of said mounting means and interposed between said eccentric and the respective mounting means in a null position to maintain said spaced parallel position of the mounting means whereby on rotation of said eccentric from a null position within a predetermined range said strain gage bridge circuit is unbalanced providing an output signal proportional to the input from the rotating shaft.

References Cited in the file of this patent

UNITED STATES PATENTS

| 2,419,061 | Emery | Apr. 15, 1947 |
| 2,471,423 | Gisser | May 31, 1949 |
| 2,522,117 | Holt et al. | Sept. 12, 1950 |

OTHER REFERENCES

Automotive Industries, April 1, 1951, pages 92 and 94.